April 29, 1958     M. P. WINTHER     2,832,449
FLOWABLE MAGNETIC MATERIAL DRIVE
Filed March 25, 1954     2 Sheets-Sheet 2

INVENTOR.
MARTIN P. WINTHER
BY
ATTORNEYS

United States Patent Office 2,832,449
Patented Apr. 29, 1958

2,832,449

FLOWABLE MAGNETIC MATERIAL DRIVE

Martin P. Winther, Gates Mill, Ohio, assignor to Eaton Manufacturing Company, Cleveland, Ohio, a corporation of Ohio Application March 25, 1954, Serial No. 418,643

7 Claims. (Cl. 192—21.5)

This invention relates to electromagnetic clutches of the type employing flowable magnetic materials and more particularly to the dissipation of heat from the members of the clutches having contact with the magnetic material employed.

Broadly the invention comprehends the provision of an electromagnetic clutch, brake or like mechanism of the type employing flowable magnetic materials in direct contact with relatively rotatable members thereof and wherein through the provision of a predetermined configuration, or grooving of adjacent spaced surfaces, of the relatively rotatable members, a desired dissipation of heat from the members is obtained.

It has been determined essentially important in the case of electromagnetic clutches, brakes or the like employing flowable magnetic material to provide for the proper dissipation of heat from cooperative relatively rotatable members thereof, with which the magnetic material is in contact, so as to prevent a complete lock-up of said members, by reason of the magnetic material being frictionally trapped therebetween when the mechanism is stopped but with the excitation on. The specific grooving as herein applied to said members is deemed to prevent such an occurrence.

Among the several objects of the invention is the provision of a clutch, brake or like mechanism, employing a flowable magnetic material as a power transmitting medium between relatively rotatable members thereof, that;

a. Incorporates means in portions, of the members, spaced from one another and having the flowable magnetic material therebetween effective to prevent lock-up of the members upon the stopping of the mechanism with the excitation left on;

b. Incorporates annular grooving in various circumferential surfaces of the relatively rotatable members to provide for a desired heat dissipation from the mechanism;

c. Includes at least two separate and spaced annular gaps, between the relatively rotatable members, in which the flowable magnetic material operates and a specific predetermined arrangement of annular grooves on circumferential surfaces of the members whereby heat is transmitted to a pre-selected member so as to prevent lock-up of the members upon cooling thereof; and, d. Includes at least two separate radially spaced annular gaps between circumferential surfaces of the members with flowable magnetic material in said gaps and with axially spaced annular grooves on at least one set of opposed surfaces of the members so arranged with respect to one another and of such related size whereby the flowable magnetic material can be accommodated upon cooling of the members after the operation thereof to thus prevent complete lock-up of the mechanism.

Other objects and advantages of the invention will appear from the following description taken in connection with the drawings forming a part of the specification, and in which.

Similar reference characters indicate corresponding parts throughout the several views of the drawings.

Figure 1:
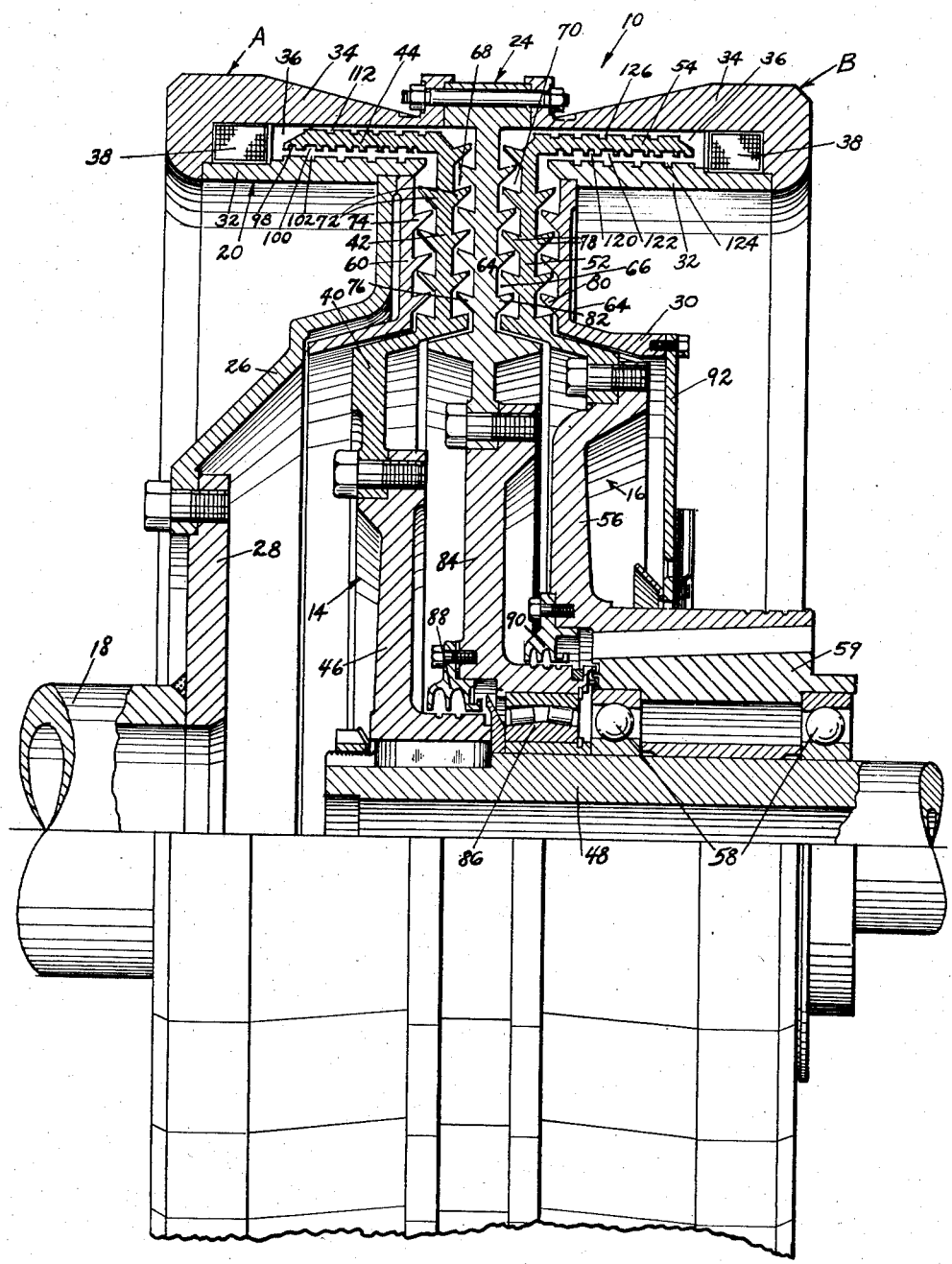
Fig. 1 is a partly broken away vertical cross-sectional view of an electromagnetic drive embodying the invention.

The present form of surface grooving applied to cooperative relatively rotatable surfaces of members of electromagnetic clutches or like mechanisms providing for the transmission of torque between relatively rotatable members thereof, wherein flowable magnetic material is utilized as a torque transmitting medium therebetween, was so devised to assuredly prevent lock-up between said members under conditions of stopping said mechanisms with the mechanisms excited. Through a predetermined arrangement of axially spaced grooves on a circumferential surface of one member of any one form of the aforesaid mechanisms and the predetermined arrangement of another group of axially spaced grooves on a circumferential surface of another member of said mechanism relatively rotatable to said first member, and through a predetermined configuration, size and spacing of said grooves, it is possible to provide appropriate storage spaces into which the flowable material can go upon stopping of the mechanism to thus prevent any possibility of the material being frictionally locked between said members due to variations in the contraction thereof as they cool. The specific grooving arrangement herein proposed has become essentially necessary especially wherein the axial width of the gap between relatively rotatable members exceeds one inch for say a one-eighth inch gap, that is normally if said grooves were not so provided the material would be prevented from squashing out of said gap to the opposite end extremities thereof. Thus in providing a series of annular grooves on one member axially spaced one inch apart and related to a series of other grooves on a cooperative radially spaced apart second member, in effect a plurality of narrow clutches or mechanisms are provided between said relatively rotatable members.

Referring to the drawings for more specific details of the invention 10 represents generally a reversing electromagnetic drive of the type more specifically defined and claimed in my co-pending application Serial No. 366,853, now Patent No. 2,794,525, dated June 4, 1957 and is presented herein solely as an illustration of a form of apparatus to which the basic invention to be claimed herein is applied.

Drive 10 comprises basically an input or prime mover driven assembly 12, and output assemblies 14 and 16, respectively.

Assembly 12 comprises a shaft 18, a pair of generally annular U-shaped channel assemblies 20 and 22, respectively, secured by one leg of each channel assembly upon a disk or plate 24, near the outer periphery thereof, an end closure plate 26 arranged in secured relation between assembly 20 and a flange 28 of shaft 18, and an end closure plate assembly 30 secured to channel assembly 22.

Shaft 18 constitutes the prime mover or engine driven shaft of the drive 10, which shaft by reason of its connection to channel assembly 20 by way of end plate 26 provides for the rotation of channel assemblies 20 and 22, plate 24 and end plate assembly 30 therewith.

Channel assemblies 20 and 22 each include inner and outer annular magnetic ring members 32 and 34 respectively, secured together at one axial end and open at their opposite axial ends to provide an annular space 36 therebetween. An annular coil 38 is disposed in space 36 of each channel assembly adjacent the closed end of the assembly. Channel assemblies 20 and 22 have one end of rings 34 secured to plate 24 with the open ends of said assemblies facing one another and with plate 24 axially disposed therebetween but with axial clearance between the one end of each ring 32 and an adjacent end face of plate 24.

Output assembly 14 includes an annular magnetic member 40 having an annular radial portion 42 and a ring portion 44, integral with portion 42 at the outer periphery thereof. Portion 42 at its inner periphery is fixedly secured to a hub member 46 with hub member 46 in turn splined to an output shaft 48.

Output assembly 16 similarly to assembly 14 includes an annular magnetic member 50 having an annular radial portion 52 and a ring portion 54, integral with portion 52 at the outer periphery thereof. Portion 50 at its inner periphery is fixedly secured to a hub member 56, which hub member 56 is in turn supported for rotation on axially spaced bearings 58 mounted annularly between the inner periphery of axial sleeve portion 59 of hub member 56 and the outer periphery of shaft 48.

Whereas the ring portion 44 of member 40 is received telescopically in radial spaced relation between ring members 32 and 34 of channel assembly 20 and ring portion 54 of member 50 is received telescopically in radial spaced relation between members 32 and 34 of channel assembly 22, radial portion 42 of member 40 is axially disposed intermediate a washer member 60 secured to end plate 26 and one face 62 of plate 24 and radial portion 52 of member 50 is axially disposed intermediate a washer 64, of end plate assembly 30, and a face 66 of plate 24 axially oppositely disposed to face 62 of plate 24.

Labyrinth seal means 68 and 70 of the type generally disclosed in Patent 2,587,077 are provided between the driven assembly 12 and output assemblies 14 and 16.

Seal means 68 includes a plurality of concentric rings 72 arranged on axial opposite faces of portion 42 of member 40 cooperative on one side of portion 42 with concentric rings 74 on washer member 60 and on the other side thereof with concentric rings 76 provided on face 62 of plate 24. Rings 72, 74 and 76 are of such shape and telescoping arrangement with one another as to provide a normally effective seal for magnetic fluid material to be carried in space 36 between rings 32 and 34 of assembly 20.

Seal means 70 includes a plurality of concentric rings 78 arranged on axial opposite faces of portion 52 of member 50 cooperative on one side of portion 52 with concentric rings 80 on washer 64 and on the other side thereof with concentric rings 82 provided on face 66 of plate 24. The concentric rings 78, 80 and 82 are are so telescopically arranged as rings 72, 74 and 76 of seal means 68 to provide like effective seal means thereto, but with specific regards to magnetic fluid material to be carried in space 36 between members 32 and 34 of assembly 22.

Plate 24 has secured at its inner periphery a hub member 84, which hub member has arranged internally thereof a bearing 86 with the inner periphery of the bearing supported on shaft 48.

Annular sealing means 88 and 90 are provided respectively between hub members 46 and 84, and hub members 56 and 84 effective to inhibit the passage of magnetic fluid material from entering bearings 58 and 86.

Plate assembly 30 includes in addition to washer 64, washer 92 secured at its outer periphery to the inner periphery of washer 64 and with its inner periphery annularly spaced a small distance from the outer circumferential surface of axial sleeve portion 59 of hub member 56, the purpose of which will hereinafter appear.

Figure 2:
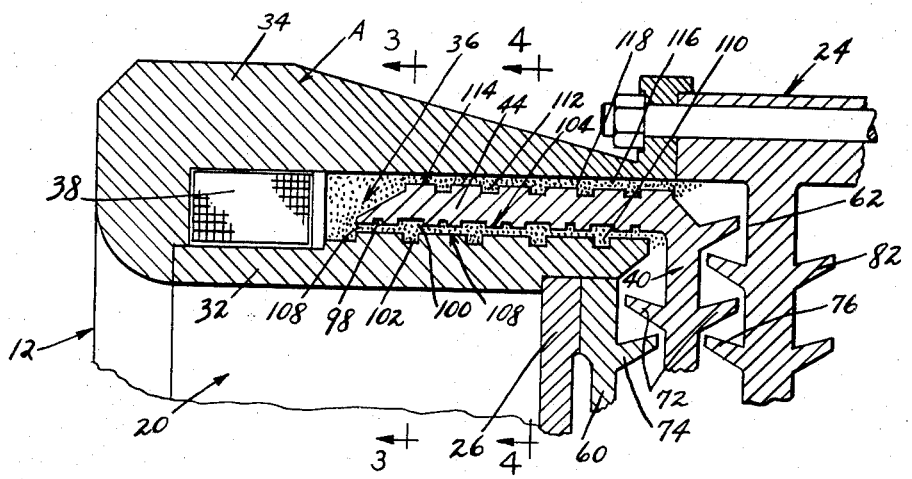
Fig. 2 is an enlarged partial view of Fig. 1.
Figure 3:
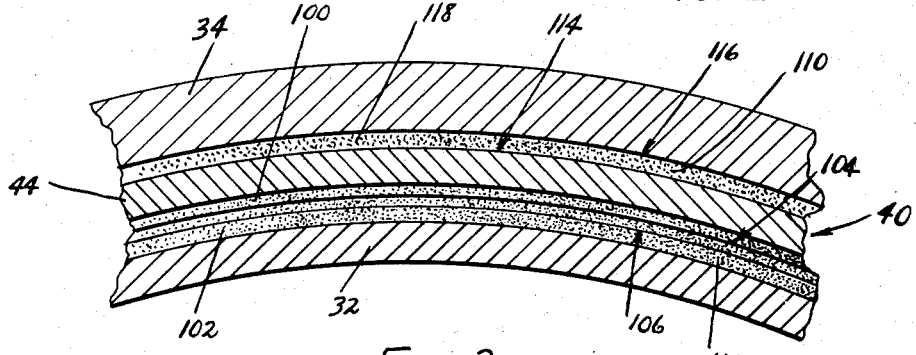
Fig. 3 is a fragmentary enlarged cross-sectional view taken substantially along lines 3—3 of Fig. 2; and, Fig. 4 is a fragmentary enlarged cross-sectional view taken substantially along lines 4—4 of Fig. 2.
Figure 4:
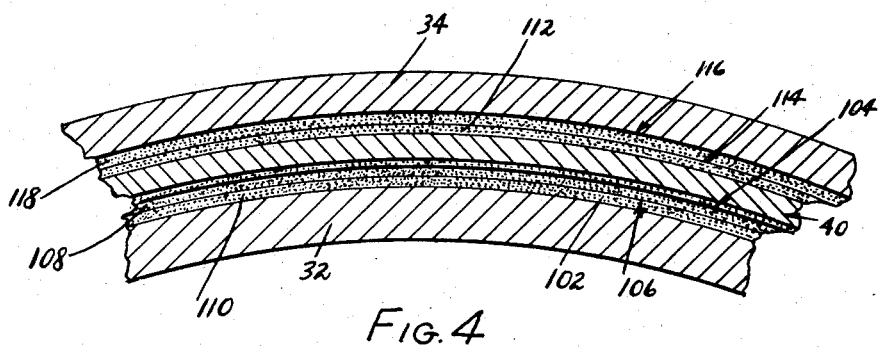

As a means of preventing a lock-up of either clutch A or B, formed by the respective cooperative assemblies 20—44 or 22—54, upon the cessation of operation or rotation of said clutches with the coils 38 thereof excited, grooves 98, 100 and 102 are provided on the radially spaced cooperative circumferential surfaces 104 and 106 respectively of portion 44 of member 40 and ring member 32. It will be noted in viewing Fig. 2 that grooves 98 and 100 are annular in form and spaced alternately an equal axial distance from one another on surface 104 of portion 44 of member 40 whereas grooves 102 are annular in form, equal in size and spaced equi-axially on surface 106 of member 32. Furthermore grooves 100 have a like depth but much greater axial width than grooves 98 and a slightly greater axial width than grooves 102 from which they are directly radially outwardly disposed. In grooves 100 being disposed directly opposite grooves 102 and of slightly greater width relative thereto they accommodate said grooves and in effect between said grooves provide a plurality of small clutches formed by the circumferential land area of surface 106, of member 32, axially between the grooves 102.

In so limiting the width of the lands between grooves 102 to say one inch for a one-eighth inch annular space or gap 108 between surfaces 104 and 106 the grooves 100 and 102 serve as annular reservoirs into which flowable magnetic material 110 can flow when rotation of the clutch A is stopped with the coil 38 excited, and thus prevent lock-up between assembly 20 and member 40 as might otherwise occur through a wedging of the flowable magnetic material between the land portions of surfaces 104 and 106.

It will be obvious from the structure of member 40 and ring member 32 that without the provision of the grooves 100 and 102, portion 44 of member 40 in tending to contract from a heated to cooled condition at a rate faster than ring member 32 of assembly 20 would freeze the flowable magnetic material 110 between surfaces 104 and 106 of the respective members 32 and 40, since it would be impossible to squash the powder axially out of gap 108.

Grooves 98 as provided in surface 104 of portion 44 of member 40 serve the purpose of providing for the maximum generation of heat, caused as a result of slip between member 40 and assembly 20, to occur in member 32 of assembly 20. This is possible since the effective circumferential area of surface 104 of member 40, between grooves 100, is less than the effective circumferential area of surface 106 between grooves 102 of member 32. As such the smaller area will pull more in shear upon the flowable magnetic material 110 than the larger area, for an excitation of known value, thereby providing for the maximum generation of heat in member 32 as compared to portion 44 of member 40.

A plurality of like annular axially spaced grooves 112 are provided on circumferential surface 114 of portion 44 of member 40, outwardly radially disposed of grooves 98 and 100. Surface 114 of portion 44 of member 40 is radially inwardly annularly spaced from a smooth unbroken cylindrical surface 116 of member 34 of assembly 20, and provides therebetween with surface 116 an air gap 118 within which magnetic material 110 is disposed similarly as in gap 108. Grooves 112 serve a like purpose between portion 44 of member 40 and member 34 as grooves 98 serve between portion 44 of member 40 and member 32, that is a maximum generation of heat in member 34. Since members 32 and 34 are disposed outwardly of clutch A and in air exposed contact externally thereof heat generated therein is rapidly dissipated therefrom to the surrounding atmosphere, thereby providing for an effective operation of said clutch.

Grooves 120, and 122 of portion 54 of member 52 and grooves 124 of member 32 of assembly 22 of clutch B serve a like purpose respectively as grooves 98, 100 and 102 of clutch B because for all respects and purposes clutches A and B are identical. Similarly grooves 126 of member 34 of assembly 22 of clutch B serves a like purpose as grooves 112 of member 34 of assembly 20 of clutch A.

The fluid magnetic material 110 herein utilized and which is disposed in gaps 108 and 118 of clutch A as well as in corresponding gaps of clutch B, is of the dry powder variety such for example as magnetic stainless steel powder and various anti-sintering and wear inhibiting additives.

In a normal operation of clutches A and B with the power input shaft thereof being driven from a suitable prime mover, not shown, assemblies 20 and 22 attached thereto and forming a part of assembly 12 are driven resulting in preventing the flowable magnetic material, under the influence of centrifugal force from entering grooves 102 and 124 of the members 32 of the respective clutches A and B. With the coils 38 of clutches A and B a driving relation is established between the driving and driven assemblies of the clutches as a result of magnetic flux passage therebetween across the gaps 108 and 118 of clutch A and the corresponding gaps of clutch B. The flowable magnetic material provided in the clutches serves to effect a high capacity of power transmission. During this phase of operation the magnetic material remains out of grooves 102 and 124 due to centrifugal force but however if the clutches are stopped, that is if the power drive is removed from shaft 118 with coils 38 in continued excited condition the material can then be moved into grooves 102 and 124 upon the contraction of portion 44 of member 40 and 54 of member 52 assuming the portions 44 and 54 are of a temperature higher than the assemblies 20 and 22 to thus relieve any possibility of lock-up of the clutches.

Although the drawings specifically illustrate and the specification defines clutch structures, the principles herein embodied are equally as applicable to brakes and like mechanisms and accordingly of "clutch" in the appended claims is not to be interpreted in a limiting sense. Furthermore it shall be readily apparent to those skilled in the art that departures can be made in structure without departing from the scope of the invention and accordingly the claims are to be so interpreted and not in a limiting sense to the previous structure disclosed.

What I claim is:

1. A magnetic clutch comprising cooperative relatively rotatable members, one of said members being disposed concentrically to and in encompassing relation to the other member and having a circumferential surface on its internal periphery annularly spaced from a circumferential surface on the external periphery of the other member, said one member having a plurality of axially spaced annular grooves on its internal periphery and a second group of annular grooves alternately spaced between the first annular grooves on said one member, of lesser axial width than the first grooves, said other member having a plurality of axially spaced annular grooves on its external peripheral surface opposite radially disposed to the greater width grooves on the one member, means for generating a flux field between the members and a flowable magnetic material in the space between the members.

2. A magnetic clutch according to claim 1, wherein the grooves on the external periphery of the other member have a lesser axial width than the grooves on the one member radially oppositely disposed thereto.

3. A magnetic clutch according to claim 2, wherein the second group of grooves on the one member have a smaller axial width than the grooves on the external periphery of the other member.

4. A magnetic clutch comprising cooperative relatively rotatable members, one of said members including a drum portion disposed concentrically in radially spaced relation to portions of the other member and providing external and internal circumferential surfaces on opposite sides thereof, with a plurality of axially spaced annular grooves on its internal periphery, said other member providing circumferential surfaces radially disposed to the respective circumferential surfaces on the one member with the circumferential surface thereof disposed oppositely to the internal peripheral surface of the one member having a plurality of axially spaced annular grooves arranged in opposite radially disposed relation to alternate grooves on the internal periphery of the one member, said members between circumferential surfaces thereof providing two annular gaps, means for generating a flux field between the members, and flowable magnetic material in the gaps between the members, said circumferential surface on the other member radially spaced from the external peripheral circumference of the one member presenting a smooth unbroken cylindrical form and said external peripheral surface of the one member having a plurality of axially spaced annular grooves thereon.

5. A magnetic clutch according to claim 4, wherein the plurality of axially spaced annular grooves on the internal periphery of the one member comprise two groups of grooves of different axial width with one another and spaced axially alternately with one another.

6. A magnetic clutch according to claim 5, wherein the first group of grooves on the internal peripheral surface of the one member are of lesser axial width than the grooves of the one on the external peripheral surface of the other member, and wherein the second group of grooves on the internal peripheral circumference of the one member are of greater axial width than the grooves on the external peripheral circumference of the other member.

7. A magnetic clutch comprising cooperative, relatively rotatable members, one of said members including a drum portion disposed concentrically in radially spaced relation to portions of the other member and providing external and internal circumferential surfaces on opposite sides thereof, said other member providing circumferential surfaces radially disposed to the respective circumferential surfaces on said one member, a plurality of axially spaced annular grooves provided on said internal peripheral surface of said one member, a plurality of grooves disposed oppositely to said internal peripheral surface of said one member, and being of lesser axial width than and disposed radially opposite to said first-mentioned grooves, a plurality of axially spaced annular grooves disposed on said external peripheral surface of said one member, said grooves lying in planes parallel to one another and perpendicular to the axis of the clutch, said members providing two annular gaps between circumferential surfaces thereof, means for generating a flux field between the members, and flowable magnetic material in said gaps between the members.

References Cited in the file of this patent

UNITED STATES PATENTS

| 2,543,394 | Winther | Feb. 27, 1951 |
| 2,605,876 | Becker | Aug. 5, 1952 |
| 2,745,527 | Winther | May 15, 1956 |
| 2,748,911 | Stahl | June 5, 1956 |

FOREIGN PATENTS

| 976,917 | France | Mar. 23, 1951 |
| 58,963 | France | Dec. 2, 1953 |

OTHER REFERENCES

Electrical Engineering, January 1951, pp. 57–59.